United States Patent
Herloski et al.

(10) Patent No.: US 9,108,358 B1
(45) Date of Patent: Aug. 18, 2015

(54) SYSTEM FOR REAL TIME MONITORING FOR DEFECTS IN AN OBJECT DURING THREE-DIMENSIONAL PRINTING USING A TERAHERTZ SENSOR

(71) Applicant: Xerox Corporation, Norwalk, CT (US)

(72) Inventors: Robert P. Herloski, Webster, NY (US); Thomas R. Race, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/249,549

(22) Filed: Apr. 10, 2014

(51) Int. Cl.
| | |
|---|---|
| *B41J 29/38* | (2006.01) |
| *B41J 2/015* | (2006.01) |
| *B41J 2/14* | (2006.01) |
| *B41J 2/16* | (2006.01) |
| *B29C 67/00* | (2006.01) |
| *B41J 2/045* | (2006.01) |
| *H04B 10/40* | (2013.01) |

(52) U.S. Cl.
CPC .............. *B29C 67/00* (2013.01); *B41J 2/04501* (2013.01); *B41J 2/14104* (2013.01); *H04B 10/40* (2013.01)

(58) Field of Classification Search
CPC ...... B41J 2/14104; C09D 11/30; B29C 67/00
See application file for complete search history.

(56) References Cited

U.S. PATENT DOCUMENTS

| | | | |
|---|---|---|---|
| 2004/0012112 A1 | 1/2004 | Davidson et al. | |
| 2005/0156110 A1* | 7/2005 | Crawely | 250/338.1 |
| 2006/0111807 A1 | 5/2006 | Gothait et al. | |
| 2006/0141145 A1 | 6/2006 | Davidson et al. | |
| 2007/0252861 A1* | 11/2007 | Wu et al. | 347/19 |
| 2009/0011066 A1 | 1/2009 | Davidson et al. | |
| 2010/0151136 A1 | 6/2010 | Davidson et al. | |

* cited by examiner

*Primary Examiner* — Lisa M Solomon
(74) *Attorney, Agent, or Firm* — Maginot Moore & Beck LLP

(57) ABSTRACT

An apparatus detects defects in an object during three-dimensional printing of the object. The apparatus uses a terahertz sensor to generate data corresponding to the thickness of an object being formed at a plurality of locations on the surface of a layer of the object. These thickness data are compared to thickness data for locations of the corresponding layer from a previous build of the object. If a difference in thickness exceeds a predetermined threshold, a defect is detected.

14 Claims, 3 Drawing Sheets

SYSTEM FOR REAL TIME MONITORING FOR DEFECTS IN AN OBJECT DURING THREE-DIMENSIONAL PRINTING USING A TERAHERTZ SENSOR

TECHNICAL FIELD

The device disclosed in this document relates to three-dimensional printers and, more particularly, to detection of defects in objects printed by such printers.

BACKGROUND

Printing of documents on substrates, such as paper, are well-known. Newer forms of printing now include digital three-dimensional manufacturing, also known as digital additive manufacturing. This type of printing is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the drops of material that form the objects. During printing of an object, one or more inkjets can deteriorate by ejecting the material at an angle, rather than normal, to the printhead, ejecting drops that are smaller than an inkjet should eject, or by failing to eject any drop at all. An inkjet suffering from any of these operational deficiencies is known as an inoperative inkjet. If the operational status of one or more inkjets deteriorates during three-dimensional object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. An apparatus that enables detection of defective objects while printing would enable restorative procedures to be applied during object printing so printing that can produce a properly formed object could continue. In this manner, product yield for the printer is improved and its printing is more efficient.

SUMMARY

An apparatus that enables defective object detection in a three-dimensional printer has been developed. The apparatus includes a transmitter oriented to direct an electromagnetic signal in a range of about 300 GHz to about 3000 GHz towards material ejected by a printhead, a receiver oriented to generate data corresponding to reflections from the material ejected by the printhead of the electromagnetic signal transmitted by the transmitter, and a controller operatively connected to the transmitter and the receiver, the controller being configured to operate the transmitter, receive data generated by the receiver, and identify defects within an object being formed with the material ejected by the printhead with reference to the data received from the receiver and data corresponding to a prior production of the object with ejected material.

A printer that incorporates the apparatus for detecting defective objects includes a printhead configured with a plurality of inkjets to eject material, a transmitter oriented to direct an electromagnetic signal in a range of about 300 GHz to about 3000 GHz towards material ejected by the printhead, a receiver oriented to generate data corresponding to reflections from the material ejected by the printhead of the electromagnetic signal transmitted by the transmitter, and a controller operatively connected to the transmitter and the receiver, the controller being configured to operate the transmitter and receive data generated by the receiver, and to identify defects within an object being formed with the material ejected by the printhead with reference to the data received from the receiver and data corresponding to a prior production of the object with ejected material.

BRIEF DESCRIPTION OF THE DRAWINGS

The foregoing aspects and other features of an apparatus or printer that detects defective objects during three-dimensional printing are explained in the following description, taken in connection with the accompanying drawings.

DETAILED DESCRIPTION

Figure 1:
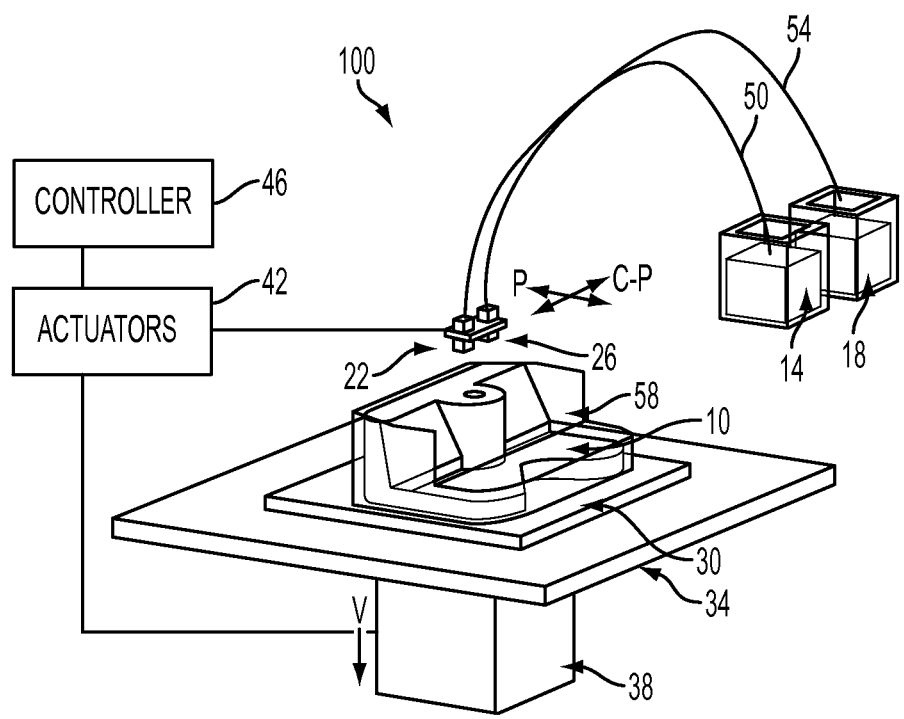
FIG. 1 is a perspective view of a three-dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional printer" refers to any device that ejects material with reference to image data of an object to form a three-dimensional object. The printer 100 includes a support material reservoir 14, a build material reservoir 18, a pair of inkjet printheads 22, 26, a build substrate 30, a planar support member 34, a columnar support member 38, one or more actuators 42, and a controller 46. Conduit 50 connects printhead 22 to support material reservoir 14 and conduit 54 connects printhead 26 to build material reservoir 18. Both inkjet printheads are operated by the controller 46 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. The support material also allows the build material to bridge gaps in the underlying object. After the part is finished, the support structure 58 is removed by washing, blowing, or melting. While the printhead 26 depicted in FIG. 1 is fluidly connected to only one build material reservoir, the printhead 26 can be fluidly connected to more than one build material reservoir in other embodiments. In these other embodiments, different groups of inkjets eject the different build materials. That is, no inkjet in the printhead 26 ejects more than one type of build material.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
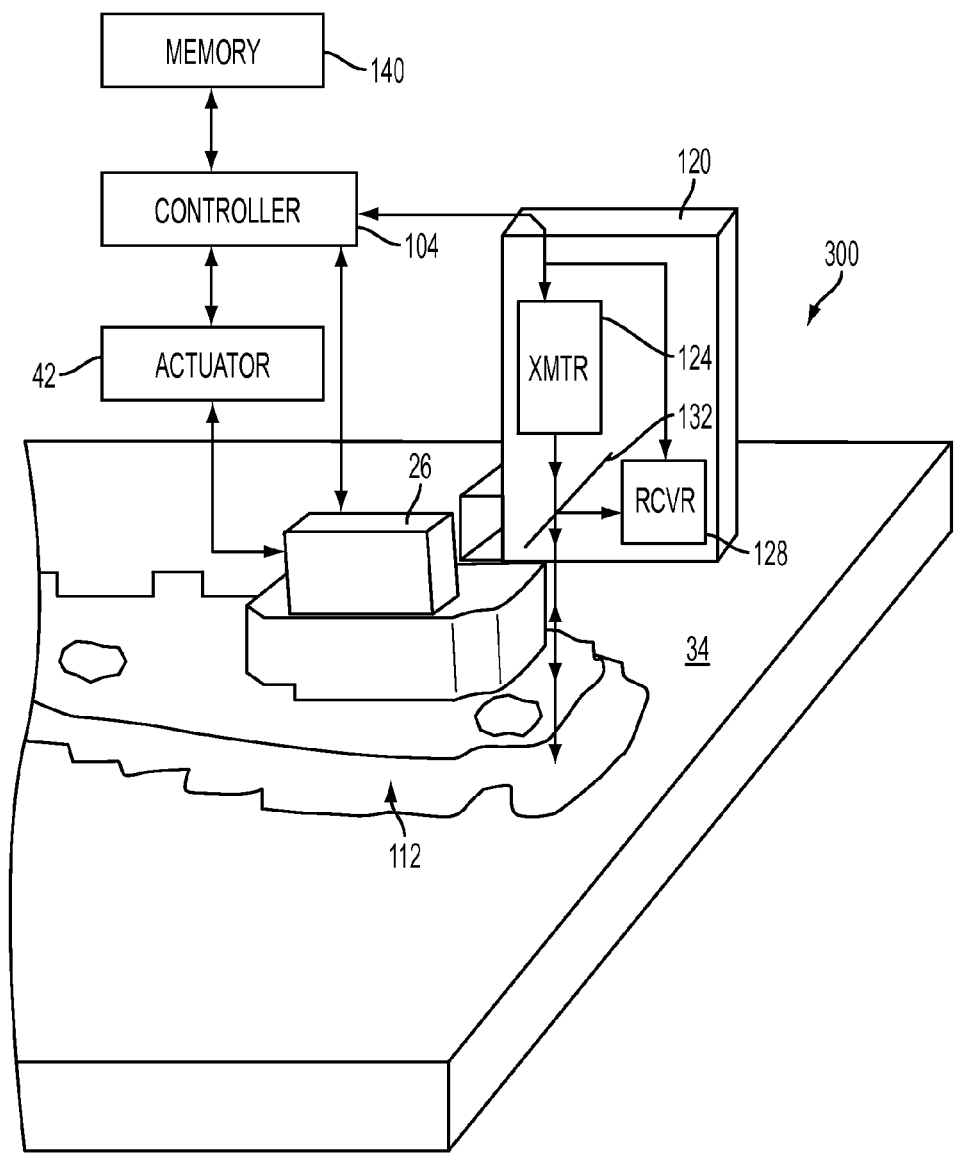
FIG. 2 is a block diagram of an apparatus that detects defects in objects being printed by a three-dimensional printer.

One embodiment 300 of an apparatus that detects defective objects during three-dimensional printing is shown in FIG. 2. In FIG. 2, a controller 104 is operatively connected to one or more of the actuators 42, the printhead 26, a terahertz sensor 120, and a memory 140. While the apparatus 300 uses a controller 104, which is different than the controller 46 (FIG. 1), controller 46 could be configured to perform the operations implemented by controller 104 as described below. The controller 104 is configured to operate a printhead 26 to eject build material towards the substrate 34 to form an object 112 on the substrate. While the description below is directed to the apparatus 300 being fixedly mounted to printhead 26 for detection of defects in the object 112 caused by inoperative inkjets in printhead 26, another similar apparatus can also be fixedly mounted to printhead 22 to detect defects produced by inoperative inkjets in that printhead as well. The controller 104 is also configured to operate actuator 42 to move the printhead 26 above the substrate 34 to form the object 112 and to move the printhead 26 to a position where the printhead 26 can be restored to operational condition.

The controller 104 communicates with the terahertz sensor 120 to monitor the formation of the object as the object is being produced by the printhead 26. The terahertz sensor 120 includes a transmitter 124 and a receiver 128. The memory provides storage for data corresponding to a previous build of an object that is the same as the object 112 being generated. The terahertz sensor 120 captured these data as the printhead 26 was operated to build the previous object. Since the objects built by printhead 26 are composed in a layer-by-layer manner, the thickness at each point on the surface of each layer in the previous object was captured. These data are used to detect anomalies in the construction of a subsequent object corresponding to the previous built object.

The transmitter 124 emits an electromagnetic pulse in the frequency range of about 300 GHz (gigahertz) to about 3000 GHz. The transmitter 124 and the receiver 128 in FIG. 2 are configured in a beam splitter arrangement with reflector 132. The reflector 132 directs a portion of the pulse reflected by the material of the object 112 to the receiver 128. This reflected pulse portion is phase shifted 180 degrees. The transmitted pulse is reflected by the top surface of the material forming the object at the point of incidence of the pulse on the surface and is also reflected by the substrate 34 after the pulse has traveled through the thickness of the material on the substrate. The receiver 128 detects both of these reflections and uses the time of delay between the two reflections to identify a thickness of the material at the point of pulse incidence on the surface of the object 112. These thickness data are provided to the controller 104, which compares the identified thickness with the thickness data for the current layer of the object at the point of incidence that is stored in memory 140. When the difference between these data are greater than a predetermined threshold, an anomaly has been detected in the construction of the object 112.

Figure 3:
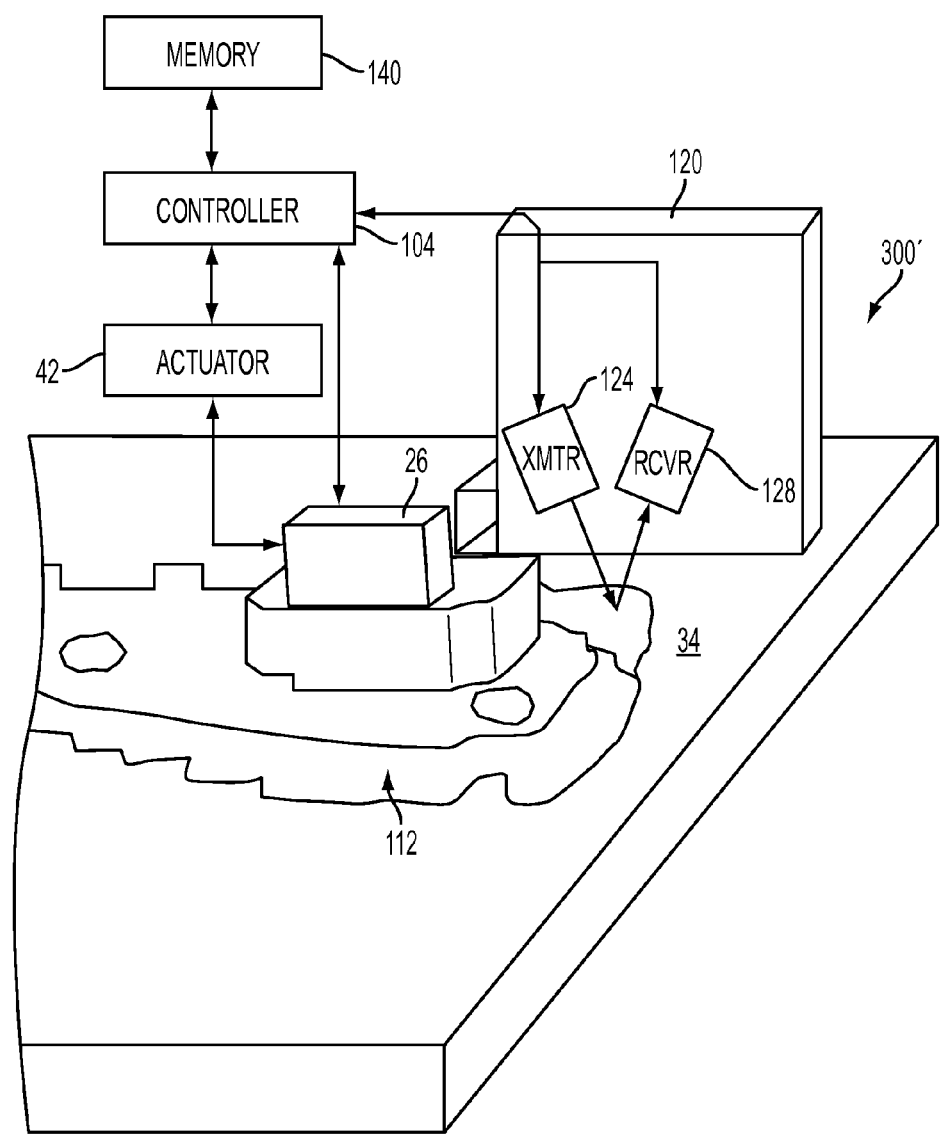
FIG. 3 is a block diagram of an alternative embodiment of the apparatus shown in FIG. 2.

Using like numbers for like elements, an alternative embodiment 300' of the apparatus that detects defective objects during three-dimensional printing is shown in FIG. 3. In FIG. 3, a controller 104 is again operatively connected to actuator 42, the printhead 26, a terahertz sensor 120, and a memory 140. Again, the controller 104 can be implemented by the controller 46 (FIG. 1) and the apparatus 300' can be fixedly mounted to the printhead 22. The controller 104 operates printhead 26 to form an object 112 on the substrate 34 as previously described and the controller also operates actuator 42 to move the printhead 26 above the substrate 34 to form the object 112 and to move the printhead 26 to a position where the printhead can be restored to operational condition. The controller 104 communicates with the terahertz sensor 120 to monitor the formation of the object 112 as the object is being produced by the printhead 26. The terahertz sensor 120 includes a transmitter 124 and a receiver 128 that are configured in an angled relationship that enables the reflector 132 to be omitted. Again, the memory 140 provides storage for data corresponding to a previous build of an object that is the same as the object 112 being generated.

The transmitter 124 of sensor 120 operates as described previously to emit an electromagnetic pulse in the frequency range of about 300 GHz (gigahertz) to about 3000 GHz. The pulse from the transmitter 124 is reflected towards the receiver 128, first by the top surface, and then by the substrate 34 after the pulse travels through object 112. The receiver 128 detects both of these reflections and uses the time of delay between the two reflections to identify a thickness of the material at the point of pulse incidence on the surface of the object 112. These thickness data are provided to the controller 104, which compares the identified thickness with the thickness data for the current layer of the object at the point of incidence that is stored in memory 140. When the difference between these data is greater than a predetermined threshold, an anomaly has been detected in the construction of the object 112.

When an anomaly is detected by either embodiment 300 or 300', various courses of action can occur. In one course of action, the controller 104 moves an operating inkjet over the position where the anomaly occurred and compensates for the missing or deficient structure with material ejected from the operating inkjet. Alternatively, the controller 104 generates a signal indicative of a defective part so an operator of the system can remove the defective part and restart object printing.

In addition to defective object detection, the controller 104 attempts to identify the inoperative inkjet that resulted in the missing or deficient structure. The term "inoperative inkjet" refers to an ejector in the printhead that does not eject material drops, ejects drops that do not correspond to the firing signal used to operate the inkjet, or that ejects a drop on an errant path. Identification of an inoperative inkjet can be made with reference to the data stored in the memory 140 and the identified thickness data received from the sensor 120. For example, a thickness greater than expected at a first point of incidence and a thickness less than expected at a nearby second point of incidence can be used to determine that the inkjet that was operated to eject material at the second point of incidence ejected an errant drop that landed at the first point. In another scenario, if the points of incidence surrounding a particular point of incidence are at a correct thickness and the thickness at the particular point of incidence exceeds the predetermined threshold, then the inkjet that ejected material at the particular point of incidence can be considered inoperative. Other techniques for identifying inoperative inkjets can be used as well.

Once an inoperative inkjet has been identified, the controller 104 determines what restorative procedure can be used to restore the inoperative inkjet to an operating condition. In one procedure to restore the inoperative inkjet, the controller 104 can operate the actuator 42 to move the printhead 26 to a position where material drops ejected by the printhead no longer form the object 112. At this position, the inoperative inkjet can be operated with a firing signal of a significantly higher frequency and/or magnitude in an effort to clear the manifold or material chamber within the inoperative inkjet. Alternatively or additionally, a purge operation can be conducted on the printhead 26. In a purge operation, the controller 104 operates a pressure source, which is operatively connected to the printhead, to increase the pressure within the printhead 26 to force build material through the inkjets in the printhead, again in an effort to clear the fluid path through the inoperative inkjet. Once the controller 104 has operated the printhead 26 in an effort to restore the inkjet and has operated a wiper or other cleaner to remove the build material emitted by the inkjets from the face of the printhead, the controller can operate the inoperative inkjet to verify the restoration of the inkjet. To perform this verification, the controller 104 operates the inoperative inkjet to eject material from the inkjet in a test area and communicates with the terahertz sensor 120 to measure the thickness of the one or more material drops at the expected location of the drops in the test area. If the controller 104 determines the data from the sensor 120 does not correspond to the expected thickness at the expected location, a signal can be generated that indicates the printhead requires additional maintenance or replacement by an operator. Once the printhead 26 has been restored, if the anomaly was not compensated with other inkjets previously, the controller 104 operates the actuator 42 to move the printhead 26 to the appropriate location on the object 112 where the restored inkjet is operated to correct the defect in the object. Printing of the object can then continue from where it was previously halted.

If the controller 104 was unable to identify an inoperative inkjet that caused the anomaly detected in the object, the controller 104 can perform a procedure to identify inoperative inkjets in the printhead 26. To identify an inoperative inkjet, controller 104 operates the actuator 42 to move the printhead 26 to a test area on the substrate 34 where material drops ejected by the printhead 26 no longer form the object 112. The controller 104 then operates the inkjets in the printhead to form uniform layers of build material. If the spacing of the inkjets in the printhead 26 is adequate to associate each layer produced with one of the inkjets in the printhead, all of the inkjets can be operated simultaneously to form a layer with each inkjet. If the spacing is too close to provide the association of each layer with one of the inkjets, then the controller 104 operates inkjets in the printhead 26 that are sufficiently distant from one another to enable association of each layer with one of the inkjets to form a group of uniform layers. The controller 104 then moves the printhead 26 to another position in the test area and operates another group of inkjets that are sufficiently distant from one another to enable association of each layer with one of the inkjets to form another group of uniform layers. This process is repeated until all of the inkjets have been operated to form a layer. After the layers are formed, the printhead 26 moves over the printed area and the sensor 120 generates thickness measurements for each layer. If the thickness of any layer is not within a predetermined range, then the controller 104 identifies the inkjet associated with the layer as inoperative. This process is exemplary only and other techniques for identifying inoperative inkjets can be used as well.

Once an inoperative inkjet has been identified, the controller can either operate the printhead 26, as described above, or perform a purge operation on the printhead, also as described above, to restore the identified inoperative inkjet. Once the controller 104 has either operated the printhead 26 or performed a purge operation in an effort to restore the inkjet, and has operated a wiper or other cleaner to remove the build material emitted by the inkjets from the face of the printhead, the controller can operate the inoperative inkjet to verify the restoration of the inkjet. To perform this verification, the controller 104 operates the inoperative inkjet to eject material from the inkjet in a test area and communicates with the terahertz sensor 120 to measure the thickness of the one or more material drops at the expected location of the drops in the test area. If the controller 104 determines the data from the sensor 120 does not correspond to the expected thickness at the expected location, a signal is generated that indicates the printhead requires additional maintenance or replacement by an operator. Once the printhead 26 has been restored, if the anomaly was not compensated with other inkjets previously, the controller 104 operates the actuator 42 to move the printhead 26 to the appropriate location on the object 112 where the restored inkjet is operated to correct the defect in the object. Printing of the object can then continue from where it was previously halted.

While both of the embodiments 300 and 300' of the apparatus have been shown as installed in a printer 100, the sensor 120, controller 104, and memory 140 can be configured in a module. The module can be fixedly mounted to a printhead in a printer and the controller 104 communicatively connected to the controller operating the printer. The printer then builds an object and the data generated by the sensor 120 is stored in the memory 140 by the controller 104. Thereafter, as another copy of that object is printed, the controller 104 compares the data generated by the sensor 120 to the previously stored data and the controller generates a signal that indicates a defect has been detected when the comparison exceeds the predetermined threshold.

In the embodiments described above, the terahertz sensor 120 is fixedly attached to the printhead 26 so the sensor can be used to obtain thickness data in the object build area or in the test area. In some embodiments, the sensor configuration does not enable the sensor to be attached fixedly to the printhead 26. In these embodiments, the terahertz sensor 120 is mounted at a position within the test area. Since, in these embodiments, the sensor cannot detect anomalies in the object build area, the printhead 26 is moved from time to time to the test area. Once in the test area, the inkjets in the printhead are operated as described above to form uniform layers in the test area and the sensor 120 is used to obtain thickness data for each layer. The controller 104 uses these thickness data to identify inoperative inkjets. Once inoperative inkjets are detected, the controller 104 generates a signal indicative of inoperative inkjet detection. The operator of the printer can then conduct a visual inspection of the object to determine whether the part is scrapped or the printing can continue after printhead maintenance is performed. The printhead maintenance is performed by the controller operating components and can include one or more of inkjet operation to clear the inkjet, a printhead purge operation, or another known printhead maintenance function. Once the printhead maintenance is performed, the controller 104 operates the inoperative inkjets to form the uniform layers to verify the efficacy of the printhead maintenance procedure. Only if the operator has provided input data to the controller 104 that the object printing can continue and the controller 104 has verified the restoration of the detected inoperative inkjets does the controller 104 operate the actuator 42 to return the printhead 26 to the object build area so object printing can continue.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
    a printhead configured with a plurality of inkjets to eject material;
    a transmitter oriented to direct an electromagnetic signal in a range of about 300 GHz to about 3000 GHz towards material ejected by the printhead;
    a receiver oriented to generate data corresponding to reflections from the material ejected by the printhead of the electromagnetic signal transmitted by the transmitter; and
    a controller operatively connected to the transmitter and the receiver, the controller being configured to operate the transmitter and receive data generated by the receiver, and to identify defects within an object being formed with the material ejected by the printhead with reference to the data received from the receiver and data corresponding to a prior production of the object with ejected material.

2. The printer of claim 1 wherein the transmitter is fixedly coupled to the printhead and the receiver is fixedly coupled to the printhead.

3. The printer of claim 2, wherein the transmitter and the receiver are configured in a splitter arrangement.

4. The printer of claim 2, wherein the transmitter and the receiver are oriented at an angle to the material ejected by the printhead.

5. The printer of claim 1, the controller being further configured to:
    move the printhead to a position where material ejected from the printhead does not form the object;
    operate the printhead to form a layer of material with each inkjet in the printhead; and
    identify an inoperative inkjet in the printhead with reference to data received from the receiver and an expected thickness for each layer.

6. The printer of claim 5, the controller being operatively connected to the printhead and the controller being further configured to:
    to operate the printhead to restore the inoperative inkjet in the printhead.

7. The printer of claim 6, the controller being further configured to:
    purge the printhead to restore the inoperative inkjet in the printhead.

8. An apparatus comprising:
    a transmitter oriented to direct an electromagnetic signal in a range of about 300 GHz to about 3000 GHz towards material ejected by a printhead;
    a receiver oriented to generate data corresponding to reflections from the material ejected by the printhead of the electromagnetic signal transmitted by the transmitter; and
    a controller operatively connected to the transmitter and the receiver, the controller being configured to operate the transmitter, receive data generated by the receiver, and identify defects within an object being formed with the material ejected by the printhead with reference to the data received from the receiver and data corresponding to a prior production of the object with ejected material.

9. The apparatus of claim 8 wherein the transmitter is fixedly coupled to the printhead and the receiver is fixedly coupled to the printhead.

10. The apparatus of claim 9, wherein the transmitter and the receiver are configured in a splitter arrangement.

11. The apparatus of claim 9, wherein the transmitter and the receiver are oriented at an angle to the material ejected by the printhead.

12. The apparatus of claim 8, the controller being further configured to:
    move the printhead to a position where material ejected from the printhead does not form the object;
    operate the printhead to form a layer of material with each inkjet in the printhead; and
    identify an inoperative inkjet in the printhead with reference to data received from the receiver and an expected thickness for each layer.

13. The apparatus of claim 12, the controller being operatively connected to the printhead and the controller being further configured to:
    to operate the printhead to restore the inoperative inkjet in the printhead.

14. The printer of claim 13, the controller being further configured to:
    purge the printhead to restore the inoperative inkjet in the printhead.

* * * * *